United States Patent
Smith et al.

(10) Patent No.: US 9,595,146 B2
(45) Date of Patent: Mar. 14, 2017

(54) PERSISTENT USER IDENTIFICATION

(71) Applicant: MICROSOFT TECHNOLOGY LICENSING, LLC, Redmond, WA (US)

(72) Inventors: Robert M. Smith, Seattle, WA (US); Joseph Wheeler, Sammamish, WA (US); Victoria N. Podmajersky, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 119 days.

(21) Appl. No.: 14/083,114

(22) Filed: Nov. 18, 2013

(65) Prior Publication Data
US 2015/0137937 A1    May 21, 2015

(51) Int. Cl.
| | | |
|---|---|---|
| G05B 19/00 | (2006.01) | |
| G07C 9/00 | (2006.01) | |
| G06F 21/32 | (2013.01) | |
| H04N 21/00 | (2011.01) | |
| H04N 21/4415 | (2011.01) | |

(52) U.S. Cl.
CPC ......... G07C 9/00158 (2013.01); G06F 21/32 (2013.01); H04N 21/00 (2013.01); H04N 21/4415 (2013.01); *G06F 2221/2139* (2013.01)

(58) Field of Classification Search
CPC ........ G07C 9/00158; G07F 7/08; H04N 21/00
USPC ...................................................... 340/5.52
See application file for complete search history.

(56) References Cited

U.S. PATENT DOCUMENTS

| | | | |
|---|---|---|---|
| 6,612,928 B1 | 9/2003 | Bradford et al. | |
| 6,973,621 B2* | 12/2005 | Sie et al. | 715/720 |
| 8,972,299 B2* | 3/2015 | Kelley | 705/51 |
| 2004/0229685 A1* | 11/2004 | Smith | A63F 13/10 463/29 |
| 2006/0282682 A1 | 12/2006 | Masaki et al. | |
| 2007/0167286 A1* | 7/2007 | Roes | 482/8 |
| 2010/0002915 A1 | 1/2010 | Govan | |
| 2010/0016069 A1* | 1/2010 | Herrmann | G07F 17/32 463/25 |
| 2010/0257601 A1 | 10/2010 | Bolyukh et al. | |

(Continued)

FOREIGN PATENT DOCUMENTS

| | | |
|---|---|---|
| WO | 0232136 A2 | 4/2002 |
| WO | 2009067670 A1 | 5/2009 |

OTHER PUBLICATIONS

ISA European Patent Office, International Search Report and Written Opinion Issued in PCT/US2014/065596, Feb. 13, 2015, Netherlands, 8 Pages.

(Continued)

*Primary Examiner* — Vernal Brown
(74) *Attorney, Agent, or Firm* — Gregg Wisdom; Judy Yee; Micky Minhas

(57) ABSTRACT

Embodiments are disclosed that relate to persistently identifying a user interacting with a computing device. For example, one disclosed embodiment provides a method comprising receiving biometric data regarding the user, determining a determined identity of the user based on the biometric data, outputting a notification of the determined identity of the user, and providing a mechanism to receive feedback regarding a correctness of the determined identity of from the user.

19 Claims, 10 Drawing Sheets

(56) References Cited

U.S. PATENT DOCUMENTS

| | | | |
|---|---|---|---|
| 2012/0117633 A1* | 5/2012 | Chakra et al. | 726/7 |
| 2012/0162403 A1* | 6/2012 | Bae | H04N 7/183 348/77 |
| 2012/0257797 A1 | 10/2012 | Leyvand et al. | |
| 2013/0080789 A1 | 3/2013 | Headley | |
| 2013/0324244 A1* | 12/2013 | Mikhailov | A63F 13/04 463/31 |

OTHER PUBLICATIONS

"Automatic Sign in with Kinect", Microsoft Corporation, http://support.xbox.com/en-US/xbox-360/kinect/auto-sign-in, Accessed: Sep. 3, 2013, 3 pages.

Downey, Sarah A., "Xbox One Will Know Your Face, Voice, and Heartbeat", http://www.abine.com/blog/2013/xbox-one-will-know-your-face-voice-and-heartbeat/, May 21, 2013, 6 pages.

Jain, Anil et al., "Biometric Identification", Communications of the ACM, vol. 43, Issue 2, Feb. 2000, 9 pages.

Prabhakar, Salil et al., "Biometric Recognition: Security and Privacy Concerns", IEEE Security & Privacy, vol. 1, Issue 2, Mar. 2003, 10 pages.

Smith, Robert et al., "Attributing User Action Based on Biometric Identity", U.S. Appl. No. 13/897,446, filed May 20, 2013, 36 pages.

Smith, Robert et al., "Launch Surface Control", U.S. Appl. No. 13/907,969, filed Jun. 3, 2013, 44 pages.

\* cited by examiner

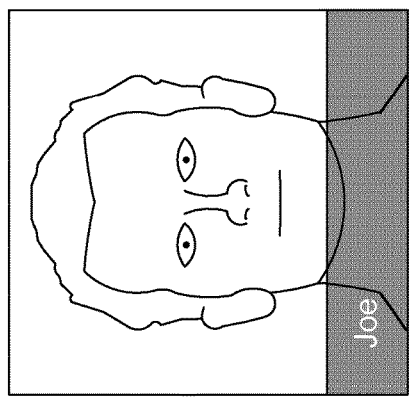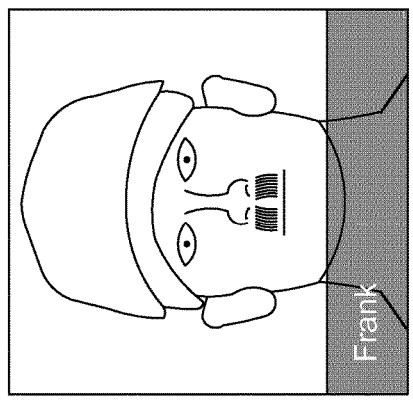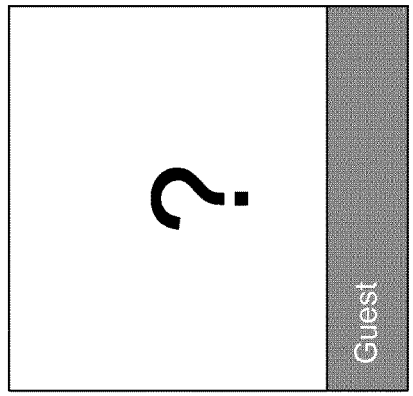
FIG. 2B
Sorry about that! Who should we recognize you as?

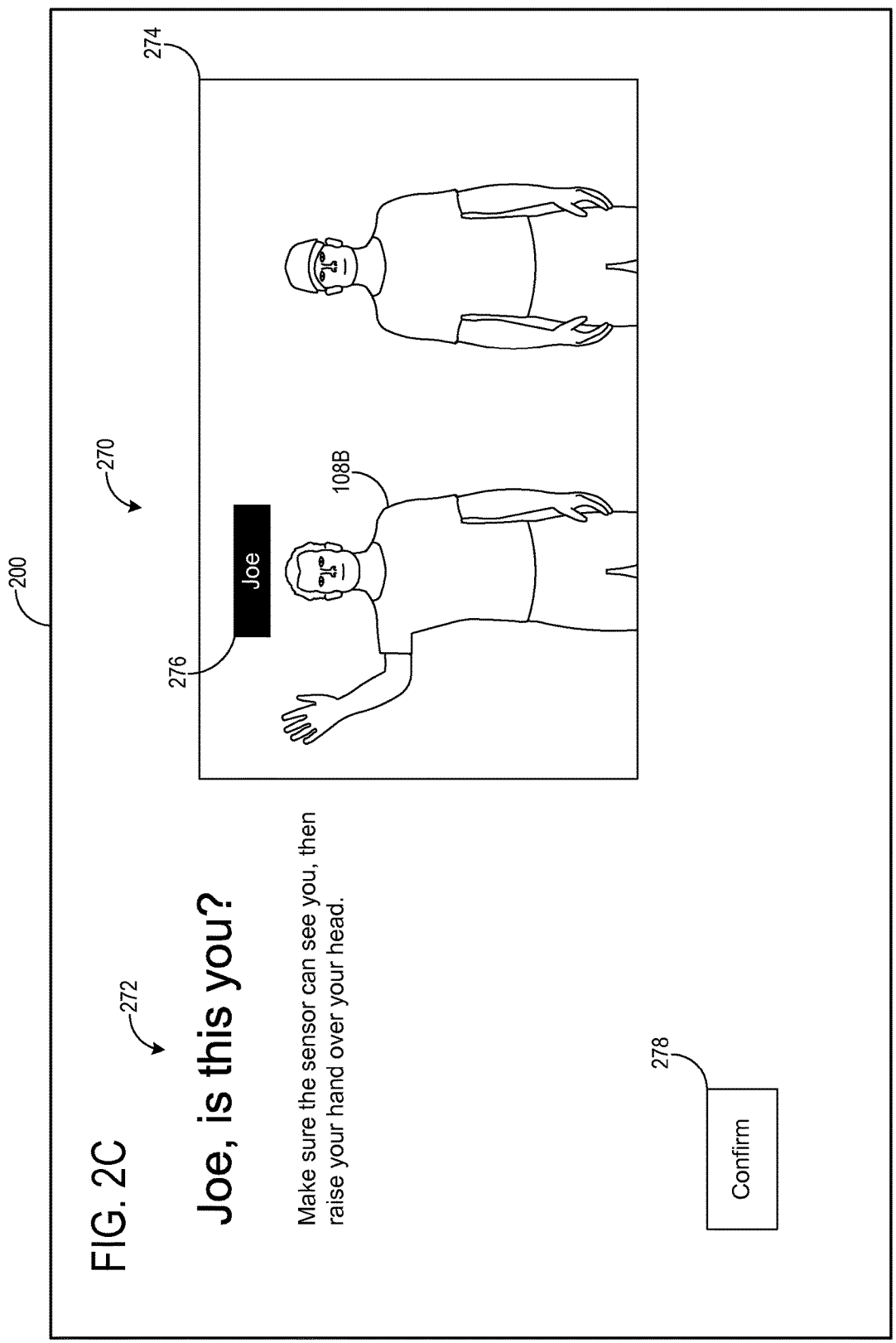

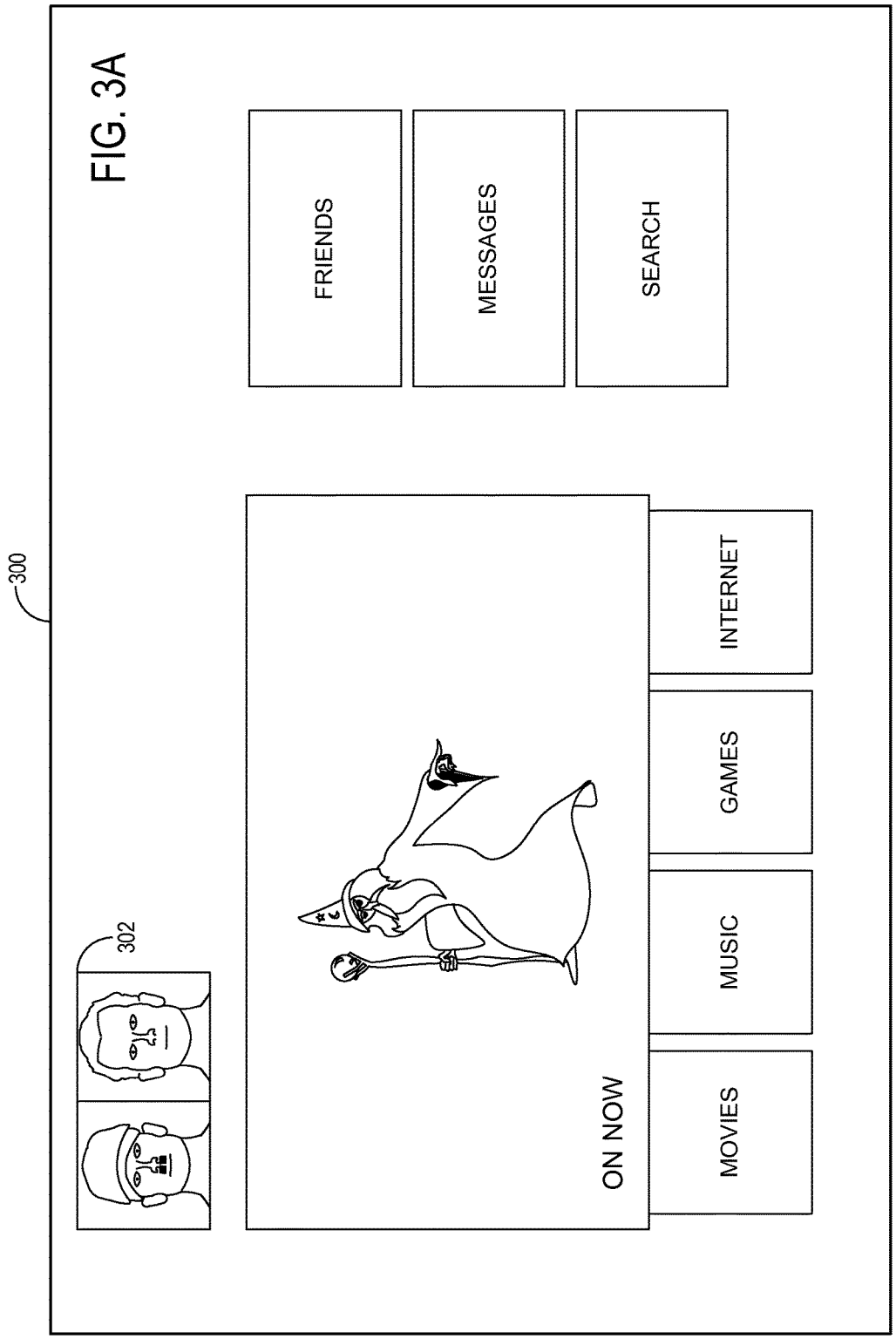

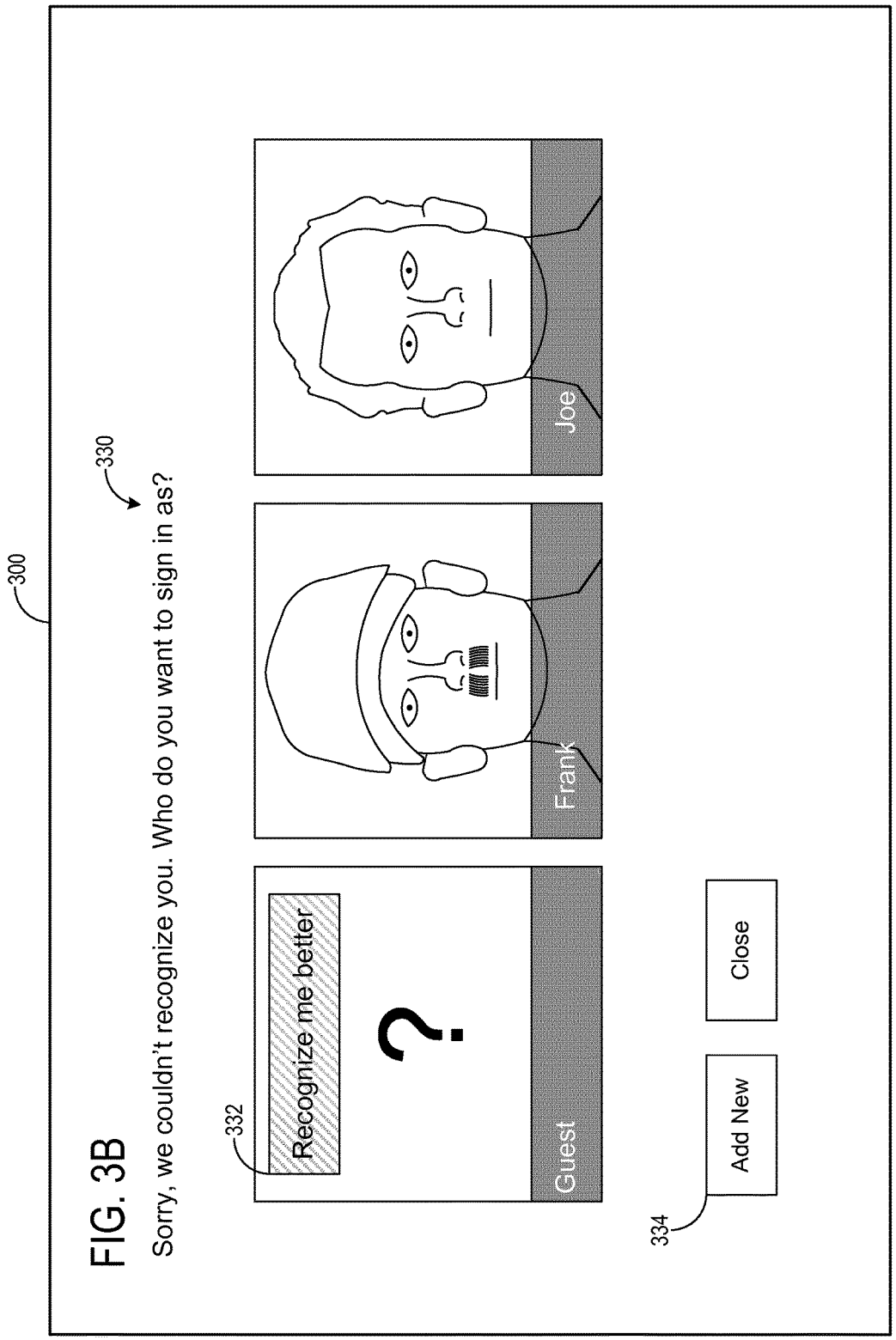

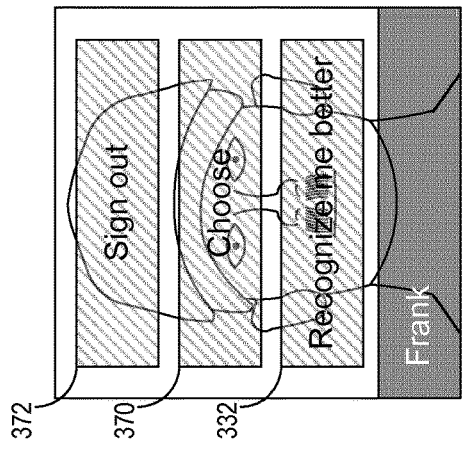

PERSISTENT USER IDENTIFICATION

BACKGROUND

In environments in which multiple users can interact with a computing device, it may be desirable to determine the identity of a user currently interacting with the computing device so that actions performed by the user may be correctly attributed to that user. In some approaches, login credentials (e.g., a username and password) supplied by the user may be used to establish the identity for a user session.

SUMMARY

Embodiments are disclosed that relate to persistently identifying a user interacting with a computing device via biometric information. For example, one disclosed embodiment provides a method comprising receiving biometric data regarding the user, determining a determined identity of the user based on the biometric data, outputting a notification of the determined identity of the user, and providing a mechanism to receive feedback regarding a correctness of the determined identity from the user.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 2A-C illustrate an example graphical user interface operable to change a determined user identity in accordance with the disclosure.

FIG. 3A-C illustrate another example graphical user interface operable to change a determined user identity in accordance with the disclosure.

DETAILED DESCRIPTION

As mentioned above, it may be desired to determine the identity of a user interacting with a computing device in an environment in which multiple users can interact with the computing device, so that actions performed by the user may be correctly attributed to that user. In some approaches, the identity of the user currently interacting with the computing device may be established based on login credentials supplied by the user. The login credentials may comprise a username and password, for example. The use of such a login process, however, may be disruptive as users enter and leave the environment while other users are interacting with the computing device. Further, such a login process may establish the authentication of a user just once during a use session, and thus may not allow a user's identity to be persistently tracked during a use session with other users.

Accordingly, embodiments are disclosed that relate to automatically and persistently identifying a user interacting with a computing device via biometric information, and to the convenient correction of misidentified users. This may allow computing device users entering an environment to be automatically recognized without a disruptive logon processes, and also tracked during a use session such that actions may be attributed to an identified user.

Figure 1:
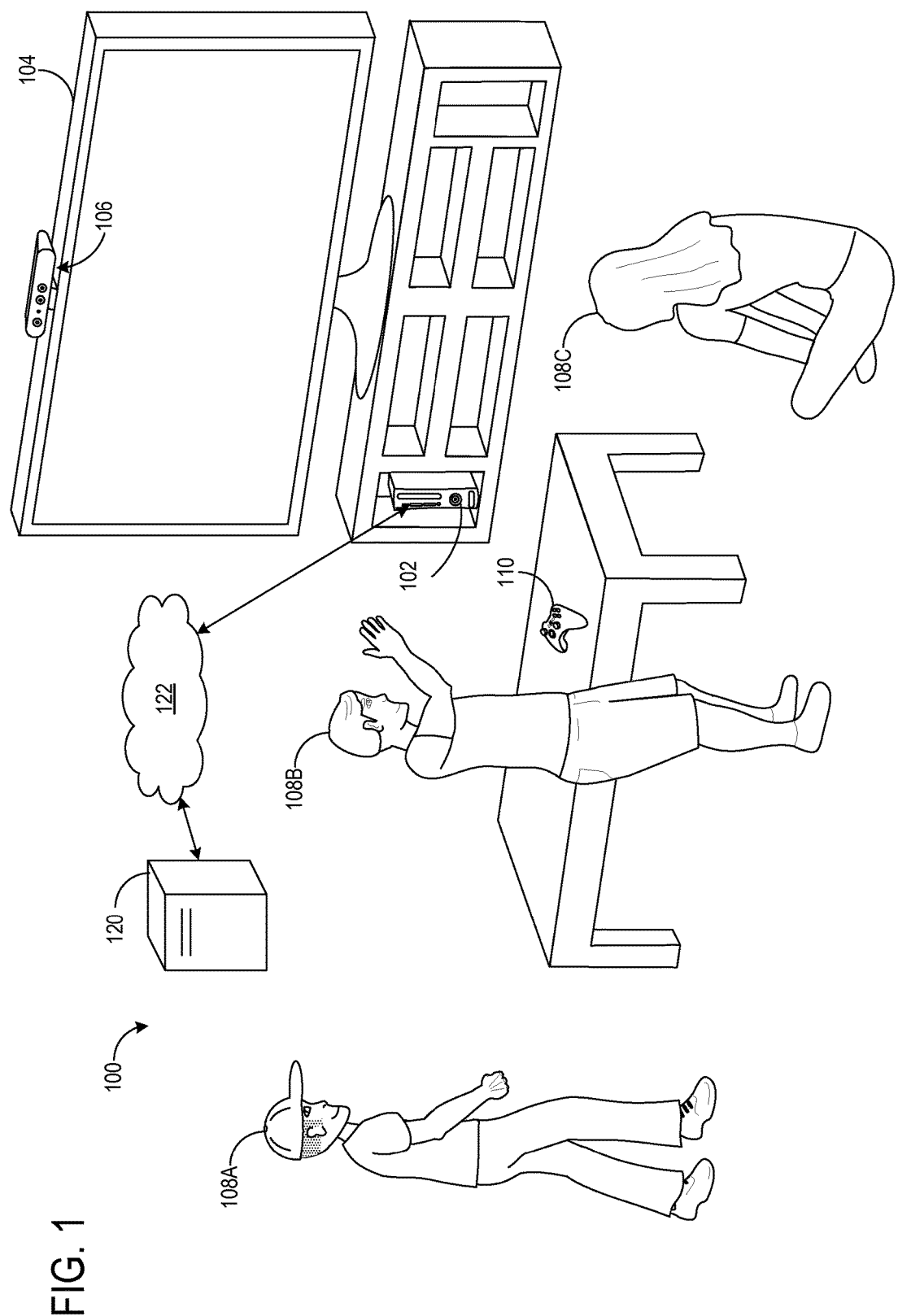
FIG. 1 shows aspects of a multi-user computing environment in accordance with an embodiment of the disclosure.

FIG. 1 shows an example environment 100 in which multiple users may interact with a computing device 102. In the depicted example, environment 100 corresponds to a home entertainment environment. However, the embodiments described herein may be used in any other suitable environment, including but not limited to residential, vehicular, work, educational, and other institutional settings.

Computing device 102 is operatively coupled to an output device 104 and a sensor system 106. In some embodiments, computing device 102 may be a videogame console or a multimedia device configured to facilitate consumption of multimedia (e.g., music, video, etc.). In other embodiments, computing device 102 may be a general-purpose computing device, or may take any other suitable form. Example hardware that may be included in computing device 102 is described below with reference to FIG. 5. Computing device 102 may be operatively coupled to output device 104 and sensor system 106 via any suitable wired or wireless communication link. Further, computing device 102 also may be operatively coupled to one or more acoustic outputs, such as speakers.

Computing device 102 is configured to accept inputs from users, illustrated as users 108A, 108B, and 108C. Users may make user inputs in any suitable manner. For example, user inputs may be made via an input device 110 operatively coupled to computing device 102. While shown as a game controller with actuatable components (e.g., buttons, control sticks, triggers, etc.), input device 110 may take other suitable forms, such as that of a keyboard, mouse, touchscreen or other touch sensor, joystick, etc. Input device 110 may be operatively coupled to computing device 102 via any suitable wired or wireless communication link, and in some embodiments may output information regarding its location and spatial orientation.

Computing device 102 may be further configured to accept natural user input (NUI) from one or more users 108. NUI may comprise gestural input and/or vocal input, for example. Regardless of the manner in which user inputs are made, computing device 102 may be configured to receive user input from two or more users concurrently and/or in a temporally-separated manner.

Output device 104 may be configured to output visual content received from computing device 102, and in some embodiments also may output audio content. Output device 104 may include any suitable type of display, including but not limited to a liquid-crystal display (LCD), organic light-emitting diode (OLED) display, cathode ray tube (CRT) television, etc. While shown in the depicted example as a large-format display, output device 104 may assume other sizes, and may comprise two or more displays. Other types of output devices, such as those including projectors, mobile device displays, wearable displays, and various types of acoustic output systems, are also contemplated.

Sensor system 106 is configured to collect biometric data regarding users 108. In some embodiments, sensor system 106 may include one or more cameras configured to collect image data of users 108, and biometric data may be extracted from the image data. The one or more cameras may collect two dimensional visible and/or infrared data, and/or depth data for the use environment. Sensor system 106 may utilize any suitable depth sensing technologies, including but not limited to time-resolved stereoscopy, structured light, and time-of-flight depth measurement. Further, sensor system 106 may output depth maps comprising a plurality of pixels each having a depth value. Sensor system also may include one or more microphones to receive speech inputs. As such, the biometric data also may include voice data representative of vocal user input. It will be understood that above-identified sensors are presented for the purpose of example and are not intended to be limiting in any manner, as sensor system 106 may include any sensors or groups of sensors which, alone or together, may detect humans or human characteristics.

While shown and described as being housed in a common enclosure as sensor system 106, one or more sensors may be provided as a separate device. Further, sensor system 106 may be integrated with computing device 102 or placed in any other suitable location.

The data output by sensor system 106 may be analyzed to determine biometric data to store in user profiles for each of users 108. As non-limiting examples, biometric data including facial shape data, body shape/weight data, and voice characteristic data may be collected. Other examples may include, but are not limited to fingerprint data, handprint data, and eye pattern (e.g. iris pattern) data. Such data may be stored locally, and/or stored at a remote location (e.g. a remote server 120) accessible via a suitable network 122, such as a local and/or wide area computer network.

Further, in some embodiments, biometric data may be used to assemble representations of one or more of users 108. For example, depth data may be used to at least partially model a user with a virtual skeleton comprising skeletal segments pivotally coupled by joints. Parameters including the position and rotational orientation may be associated with each joint, and in some embodiments the parameters may be updated at relatively high frequencies (e.g., 30 frames per second) based on data received from sensor system 106 to track the user in real-time. Assembly of a virtual skeleton of this type may be used to interpret NUI, for example. It will be understood that the sensors and biometric data types described above are provided as examples and are not intended to be limiting in any way, as other types of biometric data collected by any suitable sensor(s) may be acquired to help identify users.

As an example scenario, and referring to FIG. 1, user 108B may enter the field of view of sensor system 106 and be detected by the sensor system while other users (e.g. user 108A and 108C) are currently in a use session. Upon detecting a person entering the use environment, computing system may 102 may analyze biometric data acquired from sensor system 106 to identify the user. Biometric data collected upon initiation of a user session (e.g., prompted by the user entering the field of view of sensor system 106 or another trigger) is referred to herein as "current biometric data." The current biometric data is then compared to previously acquired biometric data stored in a biometric data store (which may be local, or accessed via a network-accessible remote service) to determine if the current biometric data matches previously acquired biometric data associated with an existing user profile stored on the computing device. As a user profile stored on computing device 102 may have an associated known user identity, comparing of the current biometric data to the previously acquired biometric data may help to identify user 108B. In this manner, user 108B may join the experience as a recognized user without disrupting the experience of users 108A and 108C via a manual login process for each user. Further, the users may be persistently tracked via data from sensor system 106 during a use session, thereby allowing user inputs to be attributed to specific users. This may help to personalize a computing device experience, as described below.

Figure 2A:
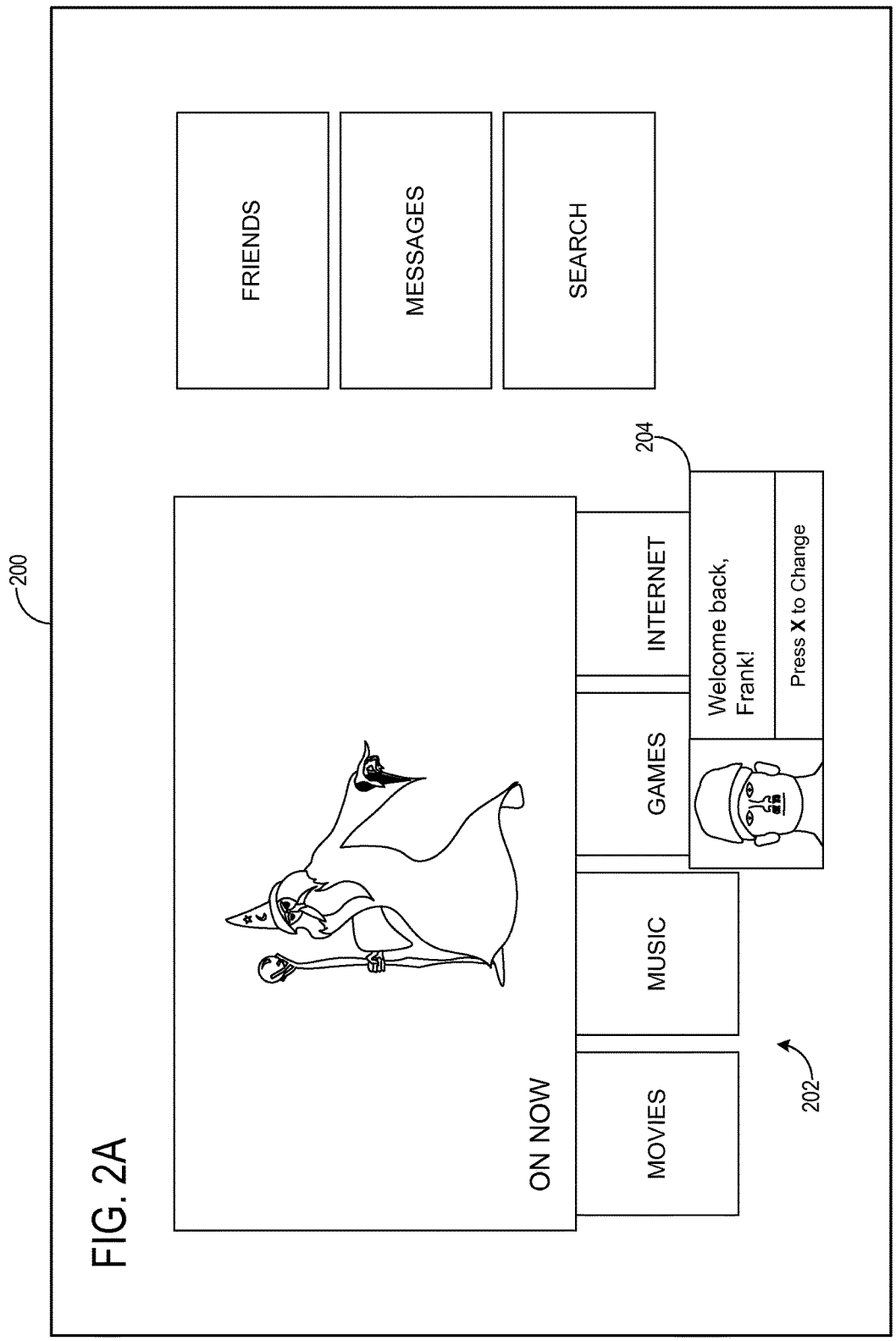

However, in some instances, computing device 102 may match a user's current biometric data to the wrong user profile. Thus, to allow a user to correct an erroneous identification, computing device 102 may provide an interactive user interface control when recognizing a person that has entered the use environment, wherein a user may interact with the user interface control if the person wants to correct a misidentification and/or improve reliability of future identifications. FIGS. 2A-C show an embodiment of a graphical user interface (GUI) 200 operable to confirm and/or correct an identity of a user that was automatically determined via biometric data. FIGS. 2A-C may represent the visual output of output device 104 throughout various stages of the scenario illustrated in FIG. 1, for example, but it will be understood that analogous inputs and outputs may be made acoustically, e.g. by microphone inputs and speaker outputs, or via other suitable mechanisms. While shown and described with reference to environment 100 in FIG. 1, it will be understood that GUI 200 may be displayed and engaged in other computing environments.

As shown in FIG. 2A, GUI 200 includes a plurality of controls 202 that may be activated by a user to effect various functionalities that may be attributed to a specific user, and that may provide outputs that are tailored for the specific user.

For example, selection of a control 202A (labeled in the figure as "FRIENDS") may cause execution of a social networking application with content (e.g., messages, friend lists, etc.) determined based on information in a user profile corresponding to the recognized user.

In its state depicted in FIG. 2A, user 108B has been detected by computing device 102 via sensor data, but misidentified. In the absence of some type of feedback when the identification process is performed, user 108B may not be aware of the misidentification until it becomes apparent at some later time (e.g. when an incorrect gamer tag, social network page, etc. is presented to the user). Thus, to allow a misidentification to be corrected upon the initial identification of the user, a notification 204 of the determined identity is output and displayed in GUI 200. In this example, notification 204 includes an avatar and also a name ("Frank") associated with the user profile of user 108A. The depicted notification 204 also includes a caption indicating that a button (in this example, 'X') on input device 110 may be actuated to change the identity of the current user. It will be appreciated, however, that other suitable inputs may be used to access the interactive user interface control, including but not limited to NUI inputs.

As the identification in FIG. 2A is incorrect, user 108B may interact with notification 204 (e.g. by actuating the "X" button as suggested by the notification, or via other suitable user input) to enter a state of GUI 200 for correcting the misidentification. FIG. 2B shows an example embodiment of such a GUI state. As depicted, a plurality of existing user profiles stored in computing device 102 are displayed via a user interface 230, which in this example includes a user profile associated with the name "Joe" and a user profile associated with the name "Frank," which was mistakenly selected for the user. While two existing user profiles are displayed in user interface 230 in this example, it will be understood that any suitable number of existing user profiles may be displayed in the user interface.

User interface 230 also includes a "Guest" user profile which is not associated with a specific user profile. In this example, selection of the Guest user profile may, for example, cause current biometric data (e.g., a facial scan of user 108B collected upon his entrance into the field of view of sensor system 106) to be associated with the Guest user profile. In some embodiments, the association of current biometric data with the Guest user profile may persist for a limited duration—for example, this association may cease when the Guest user profile is logged out of, or when computing device 102 is powered off. In other embodiments, the association of current biometric data with the Guest user profile may be persistent across multiple user sessions. Further, a user associated with the Guest user profile may enter information to create a specific user profile for that user, such that the user may use the specific user profile in future sessions, rather than the Guest profile. Examples of such information may include, but are not limited to, a name, avatar, age, multimedia and profile preferences, etc.

User interface 230 also includes an Add New control 232 which may be engaged to create a new user profile. As described in further detail below, the creation of a new user profile may involve the association of current and additional biometric data with the new user profile, in addition to other information (e.g., name, avatar, etc.). Once the new user profile is created, it may be stored as an existing user profile on computing device 102 and accessed for subsequent user sessions.

Referring next to FIG. 2C, user 108B has selected the existing user profile associated with the name "Joe" displayed in user interface 230 of FIG. 2B. By doing so, the user has provided feedback regarding the correctness of the determined identity, specifically indicating that he was incorrectly identified as "Frank." In response, a confirmation screen 270 may be displayed to gather more biometric data for use in future identifications.

The depicted confirmation screen 270 indicates the identity associated with the existing user profile previously selected in user interface 230. At the same time, user 108B is prompted to perform an identifying action so that the user identity may be confirmed, and also to allow additional biometric information to be collected and stored for user 108B. In this example, the identifying action is depicted as a hand gesture in which the hand is raised over a user's head, but it will be understood that any other suitable action may be used. Alternatively or additionally, the identifying action may comprise input received from input device 110 or another input device. In these embodiments, the input device may output data indicative of its location to ensure that input is associated with the correct user.

Confirmation screen 270 further includes a representation 274 of biometric data regarding users 108A and 108B in the field of view of sensor system 106. In this example, representation 274 comprises output (e.g., an RGB feed) from optical camera 112 of sensor system 106, which may update in real-time (e.g., at 30 frames per second). Other suitable representations of biometric data may be displayed or otherwise output, however, and may be tailored to the type of biometric data collected and the type of sensor used to do so—for example, images of user fingerprints, handprints, and irises, schematic depictions of user skeletons, and voice characteristic data (e.g. frequency plot) may be conveyed.

In the depicted embodiment, upon recognition of the identifying action, a tag 276, indicating which user in the field of view of sensor system 106 is currently identified, is overlaid on representation 274. As shown, tag 276 indicates that user 108A labeled "Joe" is identified as the leftward user from the perspective of sensor system 106. A confirm control 278 may be engaged (e.g., via input from input device 110, NUI, or other suitable input) to complete the identification process. Subsequent actions performed by user 108B may then be associated with his user profile.

The collection of additional biometric information during the above-described process may help to mitigate changes in biometric data that might otherwise cause misidentification. As non-limiting examples, the acquisition of additional biometric data may mitigate changes in lighting due to environmental lighting changes or changes in user position, and changes to user appearance such as the growth or removal of facial hair. In some embodiments, tolerance values may be derived from biometric data in a biometric data store such that changes of these and other kinds do not result in misidentification.

In some instances, a user may fail to interact with an identification notification before the notification disappears, or otherwise misses the opportunity to correct the initial identification. Thus, to allow users to view identifications given to them by the computing system, the computing system may persistently display recognized identifications of users that are currently in the use environment in a user interface control with which users may interact to correct misidentifications. FIG. 3A schematically illustrates an example embodiment of a profile control. It will be understood that the profile control is another example of a notification of a user identity that is assigned to a user in the use environment.

Upon user selection of profile control 302 (e.g. via a handheld controller, NUI input, or other suitable user input), the computing system 102 may take different actions depending upon whether the user that selected the profile control 302 can be matched to an existing profile.

FIG. 3B illustrates a user interface 330 that may be displayed if a user that selects the profile control cannot be identified. Accordingly, user interface 330 displays a "Guest" user profile and several existing user profiles respectively corresponding to the names "Frank" and "Joe." User interface 330 also displays a control configured to allow a user to indicate whether they expected to be identified and were not, and would like to improve identification in the future. In the depicted embodiment, this control takes the form of a "Recognize me better" control 332, which used to gather additional biometric data for future identifications, but the control may take any other suitable form. While displayed over the Guest profile in the depicted embodiment, it will be understood that this control may be displayed in any other suitable location. As used herein, the term "Recognize me better control" may refer to any control that performs this function, whether or not the control has this or a different title.

User selection of control 332 may initiate an identification process similar to that illustrated in FIG. 2C, in which user 108B may be prompted to perform an identifying action. Biometric data may then be stored in a biometric data store associated with a user profile corresponding to user 108B. As shown in FIG. 3B, this user profile may initially be a Guest user profile in some embodiments, or may have other suitable designation in other embodiments. User interface 330 also includes a control configured to create a new user profile. While shown as an "Add New" control 334, any other suitable indicia (text, graphic, etc.) may be used. The term "Add New control" may be used herein to represent any control that performs such a function, whether having a same or different indicia.

On the other hand, if the computing device 102 was able to associate the user that selected the profile control with a profile, then the user interface of FIG. 3C may be displayed. In the depicted example, biometric data regarding user 108B was erroneously matched to biometric data associated with an existing user profile corresponding to the name "Frank." Control 332 is depicted overlaid on the "Frank" user profile and may be engaged to effect the identification process described above in which user 108B is prompted to perform an identifying action. A Choose control 370 is also overlaid on the "Frank" user profile and may be engaged to select this user profile and identify the user currently interacting with computing device 102 as "Frank." Also, a Sign out control 372 is overlaid on the "Frank" user profile, which may allow user 108B to sign out and select to sign in under a different profile.

Figure 4A:
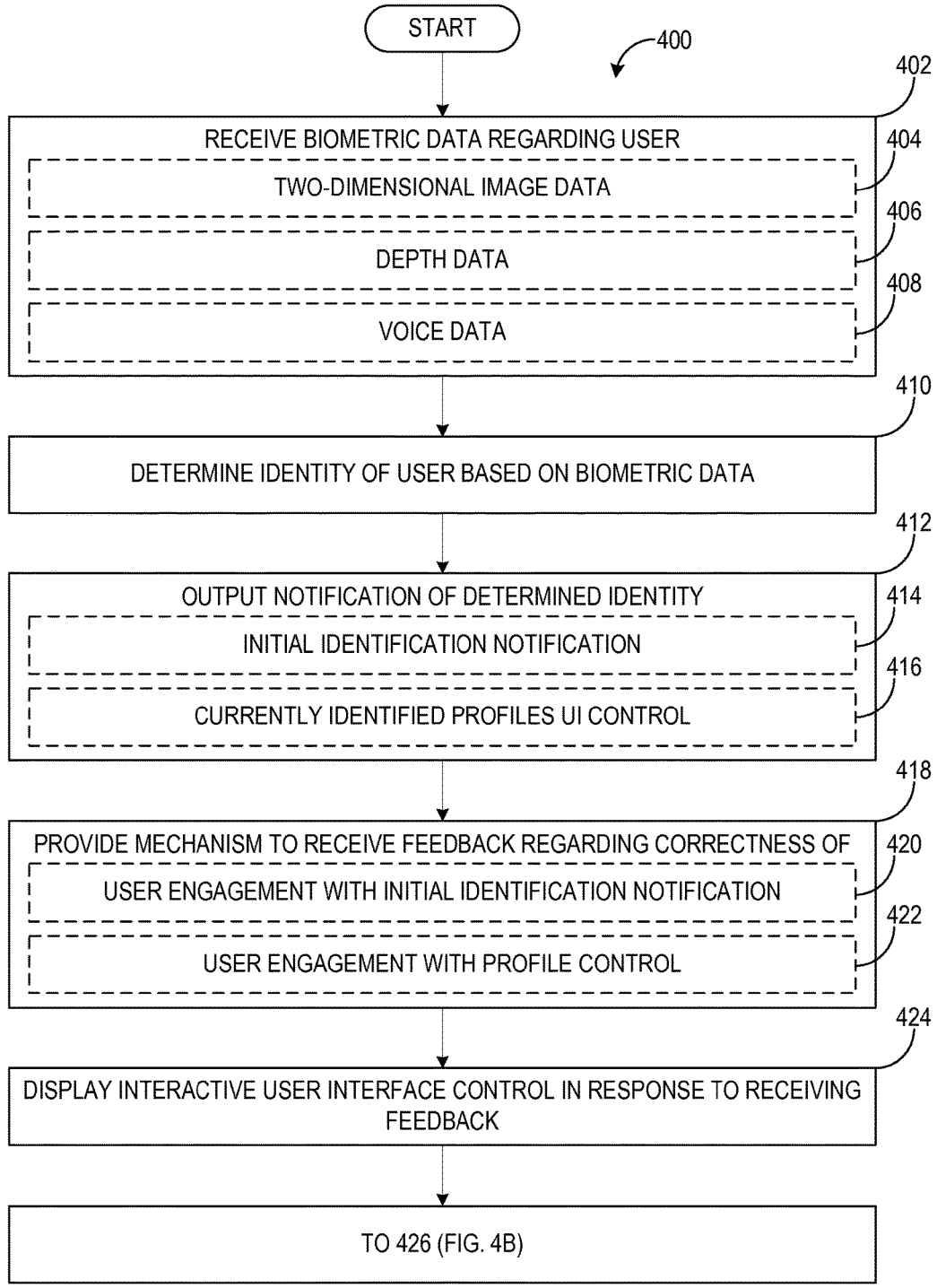
FIGS. 4A-B show a flowchart illustrating a method for identifying a user in a multi-user computing environment in accordance with an embodiment of the disclosure.
Figure 4B:
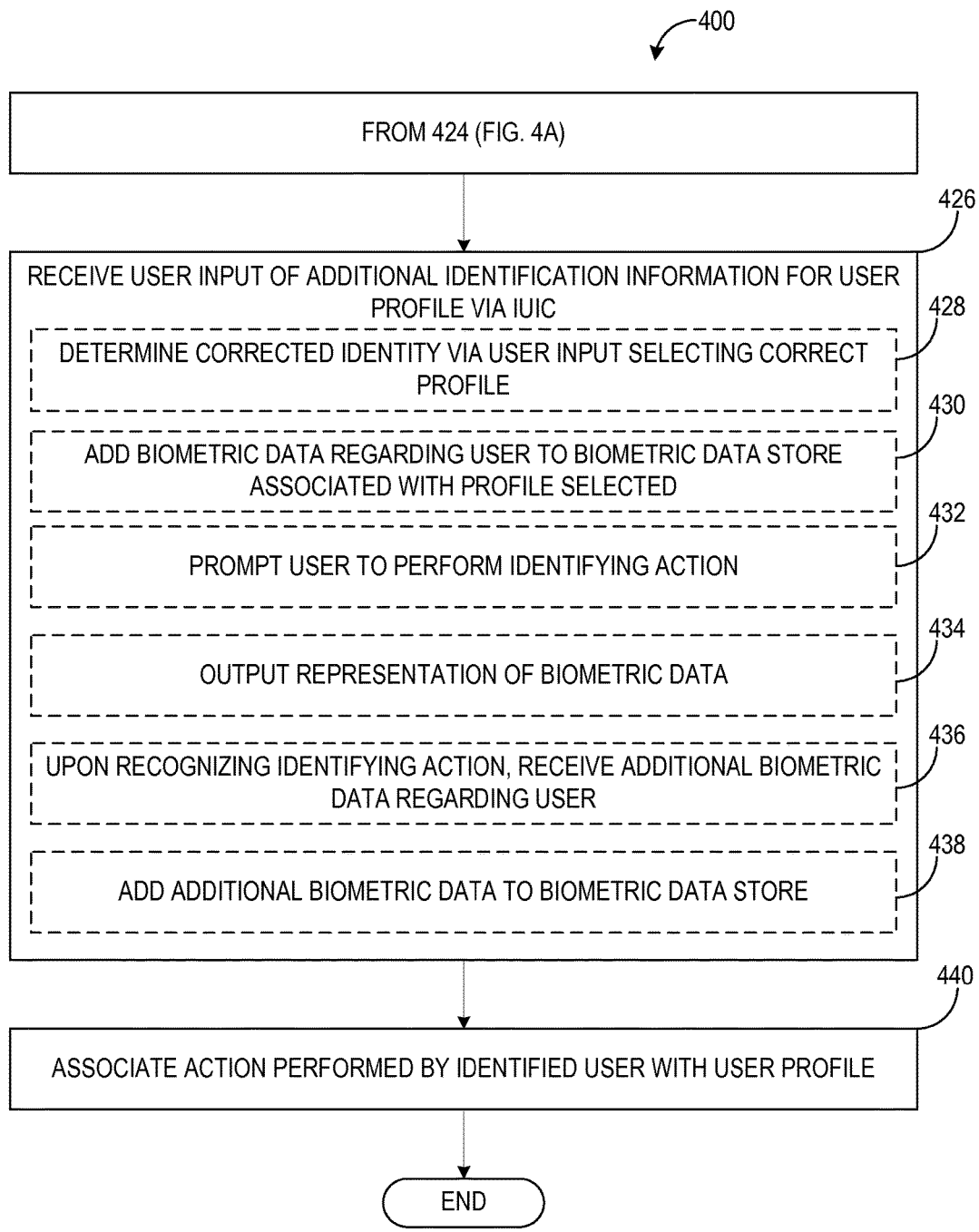

FIG. 4A shows a flowchart illustrating an embodiment of a method 400 for identifying a user in a multi-user computing environment. Method 400 may be executed on computing device 102 in FIG. 1, for example, and may be implemented as machine-readable instructions on a storage subsystem and executed by a logic subsystem. Examples of suitable storage and logic subsystems are described below with reference to FIG. 5.

At 402, method 400 comprises receiving biometric data regarding a user. Receiving biometric data may comprise receiving any data which may be used to detect humans or human characteristics. Examples include, but are not limited to, receiving two-dimensional image data at 404, depth data at 406, and/or voice data at 408. The biometric data may be received from sensor system 106 in FIG. 1, for example, or from any other suitable sensor(s). Various data may be determined from the sensor data, including but not limited to facial data, and body data, as well as finger and/or fingerprint data, hand and/or handprint data, eye and/or iris data, weight data, etc.

Next, at 410, method 400 comprises determining an identity of the user based on the biometric data received at 402. For example, current biometric data regarding the user received at 402 may be compared to previously acquired biometric data in one or more biometric data stores each associated with a user profile. As a more specific example, a facial scan of the user received at 402 may be compared with existing facial scans associated with a plurality of existing user profiles. If an acceptable match between the biometric data received at 402 and previously acquired biometric data is obtained, the user is identified and matched to an existing user profile. On the other hand, if such a match cannot be obtained, the user may, for example, be identified as a guest.

Next, at 412, method 400 comprises outputting a notification of the user identity determined at 410. In some embodiments, the notification may be a notification of an initial identification 414. The notification may present information derived from a user profile associated with the determined identity, including but not limited to a name and avatar. The notification also may include a message indicating a mechanism that may be performed by the user to change the determined identity. The notification may be displayed for a predetermined period of time, during which a user may interact with the notification to correct an identity.

The notification also may take the form of a profile control 416 that displays currently recognized profiles, such as control 302 in FIG. 3A, for example. The profile control may be displayed persistently during a use session, thereby providing a user an additional mechanism to correct an identity.

Next, at 418, method 400 comprises providing a mechanism by which to receive feedback regarding the correctness of the determined identity. For example, the feedback may take the form of an engagement with an initial identification notification 420, an interaction with a profile control 422, and/or any other suitable interaction.

In response to the feedback the system may receive about identification correctness, method 400 comprises, at 424, displaying an interactive user interface that allows a user to correct an incorrect identification. User interface 230 in FIG. 2B is a non-limiting example of such a user interface. Additional identification information then may be received at 426 from the user via user interactions with the IUIC. For example, information regarding a selection of a correct user identity to be used for the computing device use session may be received as user input, as indicated at 428. This may occur via user selection of a displayed identity, via creation of a new user profile, via selection of a Guest profile, and/or in any other suitable manner. The additional identification information may comprise a confirmation that an automatically chosen identity is correct, or may be a selection of a corrected identity.

Various actions may be taken in response to the information regarding the correct user identity. For example, method 400 may comprise, at 430, adding biometric data regarding the user to a biometric data store associated with the profile selected. This biometric data may be current biometric data acquired at 402, and/or biometric data acquired at a later time. Method 400 also may comprise, at 432, prompting the user to perform an identifying action. The user may be prompted to perform any suitable identifiable action, and the identifiable action may comprise input received from a traditional input device (e.g., game controller), a NUI sensor system, and/or any other suitable input device. Further, method 400 may comprise outputting, at 434, a representation of biometric data so that the users may view additional information during the identification process. One non-limiting example of such is shown at 274 in FIG. 2C.

Where an identifying action is performed, method 400 may additionally comprise, at 436, acquiring additional biometric data regarding the user. The additional biometric data may be of the same or different type as that of the biometric data received at 402. Further, at 438, method 400 optionally comprises adding the additional biometric data to a biometric data store associated with the profile selected (e.g., existing user profile, Guest user profile, new user profile). As described above, increasing the data held by a biometric data store associated with a user profile may increase the chance that subsequent attempts to correctly identify the user will succeed.

Continuing, at 440, method 400 comprises associating an action performed by the user with the user profile of the user. For example, the user may launch applications whose output may be customized based on the identity associated with the user profile. As a more specific example, if the user selects to play a game, the user's profile may be used for tracking game play, receiving awards, etc. Likewise, if the user selects to view social network information, information regarding members of that user's social network may be displayed.

The approaches described herein may facilitate a multi-user computing environment in which users can enter and leave the playing environment without performing manual logon or logoff processes to identify themselves, and also in which misidentifications of users may be easily corrected. This may facilitate the persistent tracking of users during computing device interaction. It will be appreciated that such approaches may be adapted for environments other than environment 100 shown in FIG. 1, and in environments in which user identification among multiple users is desired.

In some embodiments, the methods and processes described herein may be tied to a computing system of one or more computing devices. In particular, such methods and processes may be implemented as a computer-application program or service, an application-programming interface (API), a library, and/or other computer-program product.

Figure 5:
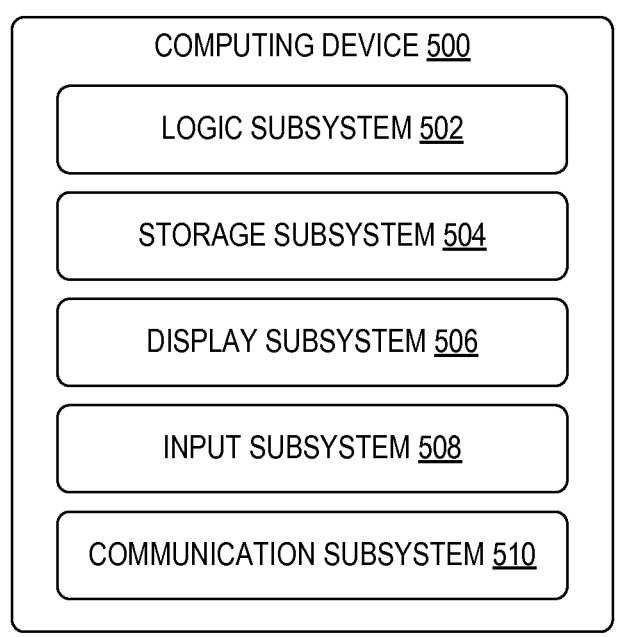
FIG. 5 shows a block diagram of a computing device in accordance with an embodiment of the disclosure.

FIG. 5 schematically shows a non-limiting embodiment of a computing device 500 that can enact one or more of the methods and processes described above. Computing device 500 is shown in simplified form. Computing device 500 may take the form of one or more personal computers, server computers, tablet computers, home-entertainment computers, network computing devices, gaming devices, mobile computing devices, mobile communication devices (e.g., smart phone), and/or other computing devices.

Computing device 500 includes a logic subsystem 502 and a storage subsystem 504. Computing device 500 may optionally include a display subsystem 506, input subsystem 508, communication subsystem 510, and/or other components not shown in FIG. 5.

Logic subsystem 502 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage subsystem 504 includes one or more physical devices configured to hold instructions executable by the logic machine to implement the methods and processes described herein. When such methods and processes are implemented, the state of storage subsystem 504 may be transformed—e.g., to hold different data.

Storage subsystem 504 may include removable and/or built-in devices. Storage subsystem 504 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 504 may include volatile, nonvolatile, dynamic, static, read/write, read-only, random-access, sequential-access, location-addressable, file-addressable, and/or content-addressable devices.

It will be appreciated that storage subsystem 504 includes one or more physical devices, and excludes propagating signals per se. However, aspects of the instructions described herein alternatively may be propagated by a communication medium (e.g., an electromagnetic signal, an optical signal, etc.), as opposed to being stored via a storage medium.

Aspects of logic subsystem 502 and storage subsystem 504 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing device 500 implemented to perform a particular function. In some cases, a program may be instantiated via logic subsystem 502 executing instructions held by storage subsystem 504. It will be understood that different programs may be instantiated from the same application, service, code block, object, library, routine, API, function, etc. Likewise, the same program may be instantiated by different applications, services, code blocks, objects, routines, APIs, functions, etc. The term "program" may encompass individual or groups of executable files, data files, libraries, drivers, scripts, database records, etc.

It will be appreciated that a "service," as used herein, is an application program executable across multiple user sessions. A service may be available to one or more system components, programs, and/or other services. In some implementations, a service may run on one or more server-computing devices.

When included, display subsystem 506 may be used to present a visual representation of data held by storage subsystem 504. This visual representation may take the form of a graphical user interface (GUI). As the herein described methods and processes change the data held by the storage machine, and thus transform the state of the storage machine, the state of display subsystem 506 may likewise be transformed to visually represent changes in the underlying data. Display subsystem 506 may include one or more display devices utilizing virtually any type of technology. Such display devices may be combined with logic subsystem 502 and/or storage subsystem 504 in a shared enclosure, or such display devices may be peripheral display devices. Display subsystem 506 may be included within an output subsystem that includes other output devices, including but not limited to acoustic output devices and haptic output devices.

When included, input subsystem 508 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 510 may be configured to communicatively couple computing device 500 with one or more other computing devices. Communication subsystem 510 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing device 500 to send and/or receive messages to and/or from other devices via a network such as the Internet.

It will be understood that the configurations and/or approaches described herein are example in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. On a computing device, a method for persistently identifying a user interacting with the computing device in a use environment, the method comprising:
   receiving image data from an image sensor, the image data capturing an image of the user and another user while the other user is in a use session with the computing device in the use environment;
   determining a determined identity of the user based on the image data;
   outputting a notification of the determined identity of the user;
   providing a mechanism for the user to correct the determined identity via an interactive user interface; and
   while persistently tracking the user and the other user during the use session,
   associating an action performed by the user on the computing device in the use environment with a user profile of the user, and associating an action performed by the other user on the computing device in the use environment with a user profile of the other user.

2. The method of claim 1, further comprising, if the identity cannot be determined, then:
   creating a new user profile;
   adding the image data capturing the image of the user to a biometric data store associated with the new user profile;
   prompting the user to perform an identifying action;
   upon recognizing the identifying action, receiving additional biometric data regarding the user; and
   adding the additional biometric data to the biometric data store.

3. The method of claim 2, further comprising while prompting the user to perform an identifying action, outputting a representation of the biometric data.

4. The method of claim 1, further comprising receiving user feedback regarding an incorrect determined identity, and in response determining a corrected identity.

5. The method of claim 4, wherein determining the corrected identity comprises:
   displaying one or more existing user profiles on the user interface; and
   receiving an input from the user selecting a user profile from the one or more existing user profiles displayed.

6. The method of claim 5, further comprising acquiring additional biometric data based upon the input from the user selecting the user profile, and associating the additional biometric data with the user profile selected.

7. The method of claim 4, wherein determining the corrected identity comprises:
   creating a new user profile;
   associating the user with the new user profile; and
   acquiring additional biometric data to associate with the new user profile.

8. The method of claim 1, wherein the image data comprises depth image data.

9. The method of claim 1, wherein the notification comprises an initial identification notification presented to the user.

10. The method of claim 1, wherein the notification comprises a persistently available profile control that displays currently recognized user profiles.

11. The method of claim 1, further comprising receiving additional biometric data regarding the user, the additional biometric data including one or more of finger data, hand data, joint data, skeletal data, facial data, eye data, voice data, and weight data.

12. The method of claim 1, wherein a correction of the determined identity by the user is received via one of a handheld user input device, an image sensor, and a microphone.

13. The method of claim 1, further comprising:
   receiving additional biometric data regarding a different user;
   determining a determined identity of the different user based on the additional biometric data;
   outputting a notification of the determined identity of the different user; and
   providing a mechanism to receive feedback regarding a correctness of the determined identity of the different user.

14. A computing system configured to persistently identify a user interacting with the computing system in a use environment, the computing system comprising:
   a logic subsystem; and
   a storage subsystem comprising instructions executable by the logic subsystem to:
      receive from an image sensor image data capturing an image of the user and another user while the user is in a use session with the computing device in the use environment;
      determine a determined identity of the user based on the image data;
      output a notification of the determined identity of the user;
      provide a mechanism for the user to correct the determined identity via interaction with a user interface; and
      if feedback is received that indicates that the identity is incorrect:
         display one or more existing user profiles; and
         receive an input from the user selecting a user profile from the one or more existing user profiles displayed.

15. The computing system of claim 14, wherein the instructions are further executable to associate an action performed by the user with the user profile selected.

16. The computing system of claim 14, wherein the instructions are further executable to:

if the identity cannot be determined, then:
  create a new user profile;
  add the image data capturing the image of the user to a biometric data store associated with the new user profile;
  prompt the user to perform an identifying action;
  upon recognizing the identifying action, receive additional biometric data regarding the user; and
  add the additional biometric data to the biometric data store.

17. The computing system of claim 14, wherein the instructions are further executable to:
if the feedback indicates that the identity is incorrect:
  after receiving the input selecting the user profile, acquire additional biometric data based upon the input; and
  associate the additional biometric data with the user profile selected.

18. A user identification system configured to persistently identify a plurality of users in a user environment, the user identification system comprising:
  a sensor system; and
  a computing device operatively coupled to the sensor system, the computing device including a logic subsystem and a storage subsystem comprising instructions executable by the logic subsystem to:
    receive image data from the sensor system, the image data capturing an image of at least one user of the plurality of users and another user of the plurality of users while the other user is in a use session with the computing device in the use environment;
    determine a determined identity of the at least one user of the plurality of users based on the image data;
    output a notification of the determined identity of the at least one user;
    provide a mechanism to receive feedback regarding a correctness of the determined identity from the at least one user via a user interface;
    if the feedback indicates that the identity is incorrect:
      display one or more existing user profiles and a control operable to create a new user profile;
      receive an input from the at least one user selecting a user profile from the one or more existing user profiles or the new user profile;
      associate the image data with the user profile or the new user profile selected; and
      persistently track the plurality of users during the use session so that user inputs of each identified user are associated with a user profile of the identified user.

19. The user identification system of claim 18, further comprising:
if the feedback indicates that the identity is incorrect:
  prompt the at least one user to perform an identifying action;
  upon recognizing the identifying action, receive additional biometric data from the sensor system regarding the at least one user; and
  associate the additional biometric data with the user profile or the new user profile selected.

* * * * *